T. DONALDSON AND R. MACKIE.
FURNACE FRONT FOR LIQUID FUEL FURNACES.
APPLICATION FILED JAN. 24, 1917.

1,309,397.

Patented July 8, 1919
5 SHEETS—SHEET 1.

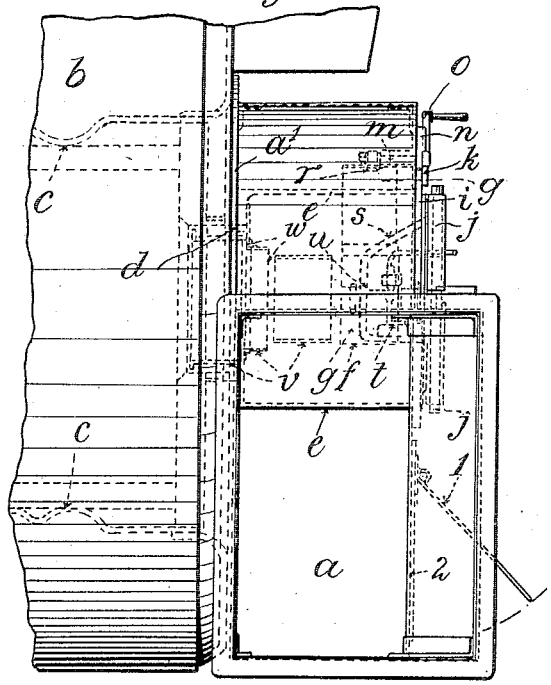

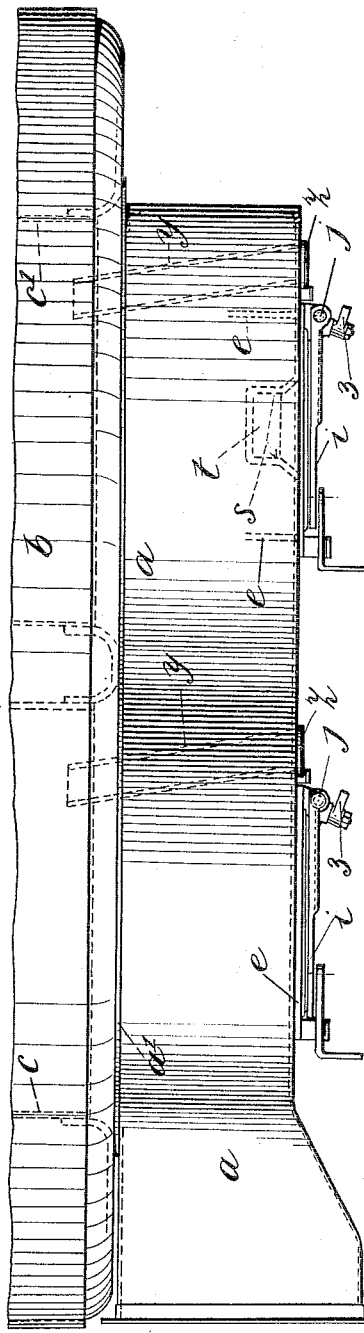

T. DONALDSON AND R. MACKIE.
FURNACE FRONT FOR LIQUID FUEL FURNACES.
APPLICATION FILED JAN. 24, 1917.
1,309,397.
Patented July 8, 1919.
5 SHEETS—SHEET 4.
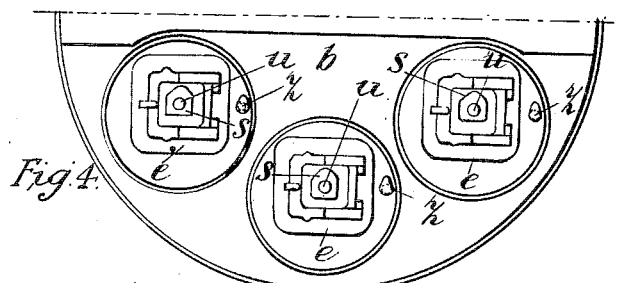
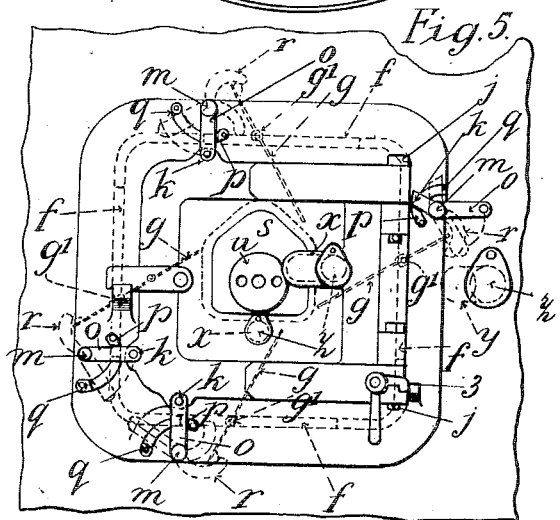
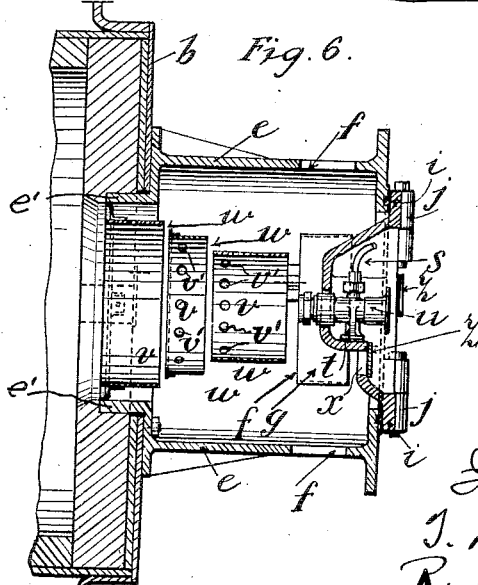
Inventors
T. Donaldson
R. Mackie,
By A. S. Pattison Atty T. DONALDSON AND R. MACKIE.
FURNACE FRONT FOR LIQUID FUEL FURNACES.
APPLICATION FILED JAN. 24, 1917.

1,309,397.

Patented July 8, 1919.
5 SHEETS—SHEET 5.

UNITED STATES PATENT OFFICE.

THORNYCROFT DONALDSON AND ROBERT MACKIE, OF WOOLSTON, ENGLAND, ASSIGNORS TO JOHN I. THORNYCROFT & COMPANY LIMITED, OF WESTMINSTER, ENGLAND.

FURNACE-FRONT FOR LIQUID-FUEL FURNACES.

1,309,397.      Specification of Letters Patent.      Patented July 8, 1919.

Application filed January 24, 1917. Serial No. 144,249.

*To all whom it may concern:*

Be it known that we, THORNYCROFT DONALDSON and ROBERT MACKIE, subjects of the King of Great Britain and Ireland, residing, respectively, at Woolston, in the county of Hants, England, have invented Improvements in or Relating to Furnace-Fronts for Liquid-Fuel Furnaces, of which the following is a specification.

This invention has reference to furnace fronts for liquid fuel furnaces supplied with forced draft and it has for object to provide an improved construction of air supply chamber, air controlling valves, furnace door, means for interlocking the furnace door and air controlling valves associated therewith so that the door and air valves can not be open at the same time, and also to provide an improved construction and arrangement of the furnace door, liquid fuel sprayer and air cone for facilitating the complete combustion in an efficient manner of the liquid fuel supplied to the furnace.

According to the invention there is provided at the front of the boiler or other furnace, an air supply casing that surrounds the liquid fuel spray producing space and forms an air supply box or chamber that is formed with air inlet openings controlled by automatic non-return valves, the front of the said box or chamber being provided with a furnace door mounted to open outward and to be locked in the closed position by fastening means adapted to close the air valves in the act of unlocking the door. In some cases, the air supply casing is located within a main air supply trunk extending across the front of the boiler or other furnace. The furnace door is dished or recessed in an inward direction and provided with a seat adapted to carry a liquid fuel sprayer, air is delivered from the air box or chamber to the liquid fuel spray proceeding from the sprayer by the aid of an air cone comprising cylindrical members that are of different diameters, are spaced apart longitudinally, are arranged co-axially with each other and the liquid fuel sprayer and are carried independently of the furnace door.

In the accompanying drawings, Figure 1 shows in front elevation, part of a steam boiler provided with a furnace front constructed according to the invention.

Fig. 2 is a side view of the boiler and furnace front.

Fig. 3 is a plan showing part of the boiler and furnace front.

Fig. 4 is a similar view to Fig. 1 illustrating a modification to suit forced draft in a closed stokehold.

Figs. 5 and 6 show respectively in front elevation and longitudinal section, one of the air casings and furnace doors of the boiler shown in Fig. 4.

Figure 1:
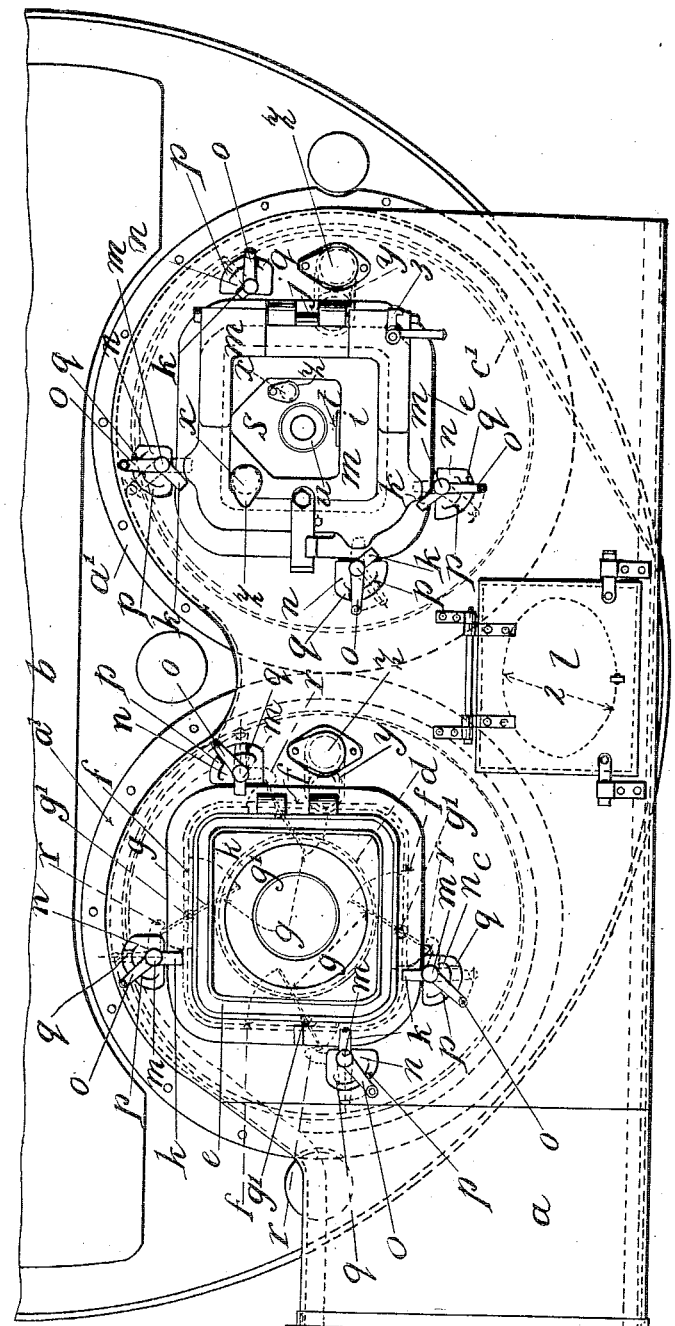

In the example shown in Figs. 1, 2 and 3, $a$ is an air trunk extending across the front of the boiler $b$ and secured thereto through a rear wall $a^1$, the trunk being open at the left hand end, which is enlarged, and closed at the other end. The rear wall $a^1$ of the air trunk is formed at a part thereof opposite each of the furnace flues $c, c^1$ with a circular opening $d$ around which and between the front and rear walls of the air trunk is fixed a rectangular casing $e$ arranged to form an air supply box or chamber the sides of which are formed with rectangular air inlet openings $f$. These openings are controlled by air valves $g$ each in the form of a plate mounted to turn about a horizontal axis at $g^1$ and balance-weighted at one end so that while it will close automatically when acted upon by a back draft in the furnace it will be turned automatically into the open position, when acted upon externally by the forced draft in the trunk $a$. Arranged opposite each air supply box or chamber $e$ is a furnace door $i$ hinged at $j$ so as to open outwardly about a vertical axis. $k$ are catches, in the form of fingers, carried by horizontal spindles $m$ adapted, when moved into the position shown in full lines at the left hand side of Fig. 1, to hold the furnace door tightly closed and when moved into the position shown in full lines at the right hand side of Fig. 1, to release the door and permit it to be opened. The spindle $m$ of each catch $k$ is carried by a bearing $n$, secured to the air trunk $a$ and is provided with a handle $o$ arranged to work between stops $p$ and $q$ on the bearing $n$. To insure that the air valves $g$ shall be positively closed before the furnace door is opened, the catch spindles $m$ are each provided at its inner end with a finger $r$ arranged in such manner that when the spindle is turned to move the corresponding catch $k$ into the inoperative position the finger $r$ thereon will move the corresponding air valve $g$ into the closed position and hold it closed. In this way the interlocking of the door and air valves can be effected in a very simple manner, the unlocking of the door acting to close the air valves. The catch $k$ at the hinge side of each door is not adapted to project in front of a lug on the door as are the other catches but is adapted to press against the back of the adjacent hinge lug on the door.

The furnace door $i$ is dished or recessed as shown at $s$ and provided with a seat at $t$ upon which a liquid fuel sprayer $u$ can be secured so that the sprayer will be moved with the door and is to a large extent surrounded and protected by the dished or recessed portion thereof so as to facilitate the flow of air and minimize liability to damage or interference by external bodies and to enable more available space to be provided at the front of the boiler for boiler attendants, than usual.

Arranged co-axially with the liquid fuel sprayer $u$ and within the air box or chamber $e$ is an air cone comprising cylindrical members $v$ of different diameters suitably connected together, and spaced apart longitudinally so as to form circumferential air inlet openings at $w$. This air cone is suitably fixed in place and in such manner that the front member $v$ thereof is independent of and spaced some distance away from the dished or recessed portion of the furnace door $i$ so that air can freely enter its front open end. The members $v$ of the cone may, as shown at $v'$, in Fig. 6, be perforated to supply additional air to the interior thereof for admixture with and for burning the fuel spray proceeding from the sprayer $u$. As described, air can be supplied in a uniform and very advantageous manner, all around the jet of sprays issuing from the liquid fuel sprayer so that the combustion of such spray can be effected in a more uniform, complete and advantageous manner than heretofore usual.

$x$ are sight and ignition openings in the front wall of the air trunk for viewing the interior of the air supply box or chamber $e$, and $y$ are sight tubes extending across the air trunk $a$ for viewing the interior of the furnace flues $c$, $c^1$, each sight opening or tube being normally closed by a pivoted cover $z$. 1 is a door hinged at the top to the front wall of the trunk $a$ and normally closing a manhole 2 in such front wall.

In the modification shown in Figs. 4, 5 and 6, for use with forced draft in a closed stokehold, the air trunk $a$ is dispensed with, the air supply box or chamber $e$ constituting an air supply casing in front of each furnace flue. With this exception the arrangement is substantially the same as that already described with reference to Figs. 1, 2 and 3, like parts being indicated by corresponding references. As will be seen the air inlet openings $f$ are arranged at the outer edge of the air cone so that there is no danger of a flash back into the stokehold. 3 indicates a catch for holding the door $i$ in an open position.

Figure 8:
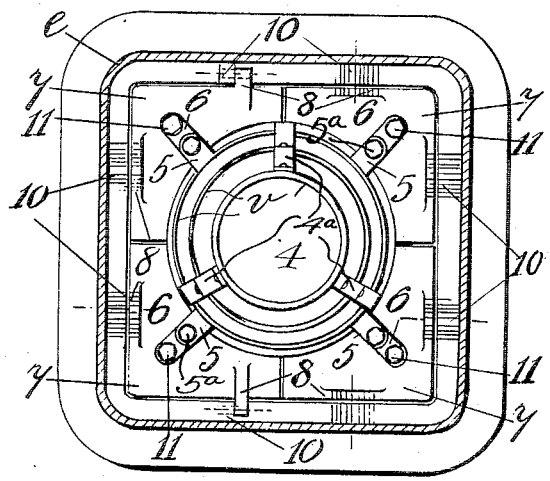
Fig. 8 is a cross sectional elevation taken on the line A A of Fig. 7.
Figure 7:
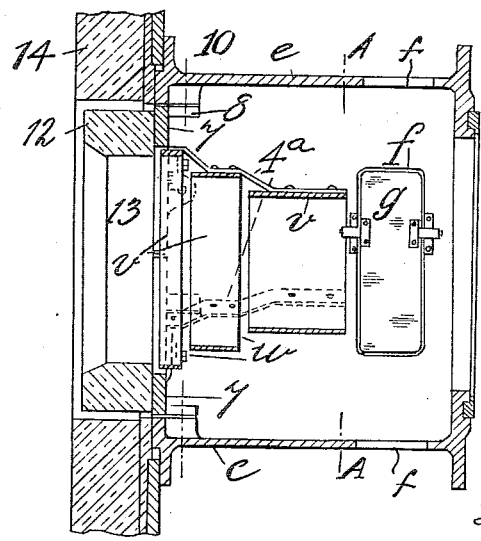
Fig. 7 shows in longitudinal section, one of the air casings with air cone and the adjacent front portion of a furnace and illustrates a modified method of supporting the air cone.

The air cone $v$ can be supported in position in various ways. In the arrangements shown in Figs. 1 to 6 inclusive, its rearmost member $v$, namely that next the furnace flue $c$ is supported in a ring 4 fixed in the inner tubular extension $e^1$ of the air box $e$, as shown more clearly in Fig. 6, the several members $v$ being connected together by say three longitudinal bent bars $4^a$ fixed to the outside of the members as shown in Figs. 7 and 8. In order however better to protect the front member $v$ of the air cone from the heat in the furnace flue $c$, the arrangement shown in Figs. 7 and 8 is preferred. In this case, the air cone is supported in position by means of angle brackets 5 that are fixed to the exterior of the innermost member $v$ of the cone and are connected by screw bolts $5^a$ to bosses 6 cast on vertical metal plates 7. These plates 7 are provided with lugs or flanges 8 by which they are fixed as by screws, to bosses 10 cast on the inside of the air supply casing $e$. Conveniently there are four plates 7 and to their inner sides is fixed as by bolts 11, passing through the bosses 6, a hollow rectangular shaped block 12 of refractory material, such as fire clay, that is arranged to extend in front of and thus protect the rear edge of the rearmost member $v$ of the air cone and to surround the opening 13 through which the mixed jet of liquid fuel and air and resulting flame enter the furnace flue $e$. 14 is the refractory material usually arranged at the front end of the flue $e$.

What we claim is:—

1. In a liquid fuel furnace supplied with forced draft, the combination with the front end of the furnace of an air supply chamber arranged opposite the furnace and provided with air inlet openings, a door closing an opening in the front end of the chamber, means for spraying liquid fuel into said chamber, non-return valves controlling said air openings, fastening means for locking the door in the closed position and means adapted to close the air valves in the act of moving the fastening means into a position to unlock the door.

2. In a liquid fuel furnace supplied with forced draft, the combination with the front end of the furnace of an air supply chamber arranged opposite the furnace and provided with air inlet openings, a door closing an opening in the front end of the chamber, means for spraying liquid fuel into said chamber, non-return valves controlling said air openings, fastening means for locking the door in the closed position, said fastening means each comprising a movable device adapted when moved into one position to retain the door in a closed position and when moved into another position to become free of the door and also a second movable device adapted to move the associated air control valve into the closed position when the first mentioned movable device is moved into the open position and to permit said air valve to move into the open position when the first mentioned movable device is moved into the closed position.

3. In a liquid fuel furnace supplied with forced draft, the combination with the front end of the furnace of an air supply chamber arranged opposite the furnace and provided with air inlet openings, a door closing an opening in the front end of the chamber, means for spraying liquid fuel into said chamber, non-return valves controlling said air openings, fastening means for locking the door in the closed position, said fastening means each comprising a rotary spindle provided with an outer catch adapted to lock and unlock the door and with an inner catch adapted to close and release the associated air valve, the outer finger when moved into its operative position, causing the inner finger to move into its inoperative position and vice versa.

4. In a liquid fuel furnace supplied with forced draft, the combination with the front end of the furnace of an air supply chamber arranged opposite the furnace and provided with air inlet openings, automatic non-return valves controlling said air openings, a door mounted to open outwardly about a vertical axis and normally to close an opening in the front end of said chamber, a liquid fuel sprayer carried by said door and adapted to inject liquid fuel spray into said chamber and interlocking means between said door and air control valves, said interlocking means being arranged to release said valves when the door is held closed and to close said air valves when the door is unlocked.

5. In a liquid fuel furnace supplied with forced draft, the combination with the front end of the furnace of an air supply chamber arranged opposite the said furnace and provided with air inlet openings in its wall, air valves controlling said openings, each in the form of a flap valve mounted to turn about a horizontal axis and when free to open automatically under air pressure, a door mounted to open outward about a vertical axis and normally to close an opening in the front end of said chamber, a liquid fuel sprayer carried by said door and door fastening means comprising horizontal spindles each provided at its outer end with a handle adapted to be moved into positions opposite and clear of the door and at its inner end with a finger, adapted to engage one edge of the associated air valve when the said handle is moved into the inoperative position, and means for limiting the motion of each hand lever in each direction.

6. A liquid fuel arrangement according to claim 1, wherein there is combined with the spraying means, an outwardly moving door dished or recessed in an inward direction thereby forming walls, substantially perpendicular to each other, one whereof is substantially horizontal and adapted to form a horizontal seat for the body of the liquid spraying means while the other is provided with an opening adapted to permit the nozzle of the liquid spraying means to pass freely therethrough, the said recessed door portion protecting the complete sprayer.

7. In a liquid fuel furnace, the combination with the front end of the furnace of an air supply chamber arranged opposite said furnace and provided with air inlet openings in its wall, non-return valves controlling said openings, an inwardly dished door mounted to open outwardly about a vertical axis and normally to close an opening in the front end of said chamber, a liquid fuel sprayer carried by said door and projecting through an opening therein and an air cone mounted within said air chamber independently of said door and comprising cylindrical members of different diameters spaced apart longitudinally and arranged co-axially with each other and with the liquid fuel sprayer.

8. In a liquid fuel furnace, the combination with the front end of the furnace of an air supply chamber arranged opposite said furnace and provided with air inlet opening in its wall, non-return valves controlling said openings, an inwardly dished door mounted to open outwardly about a vertical axis and normally to close an opening in the front end of said chamber, a liquid fuel sprayer carried by said door and projecting through an opening therein, vertical metal plates arranged around an opening at the front end of the furnace and secured to the inner side of said air chamber, blocks of refractory material carried by said plates and arranged to form between them, an opening opposite the furnace and an air cone mounted within said air chamber independently of said door and comprising cylindrical members of different diameter, fixed apart longitudinally and arranged coaxially with each other and with the liquid fuel sprayer and having the front edge of its inner and larger member shielded by said blocks of refractory material.

Signed at the American consulate, Southampton, England this second day of January, 1917.

THORNYCROFT DONALDSON.
ROBERT MACKIE.

Witnesses:
ALFRED KENT BALLS,
HARVEY J. BAVERSTRET.

Copies of this patent may be obtained for five cents each, by addressing the "Commissioner of Patents, Washington, D. C."